United States Patent [19]
Youmans et al.

[11] Patent Number: 5,303,946
[45] Date of Patent: Apr. 19, 1994

[54] TAG AXLE WITH REARWARDLY EXTENDING SUPPORT FRAMEWORK

[75] Inventors: Gordon D. Youmans; Audrey L. Youmans, both of Anderson, Calif.

[73] Assignee: Prime Technologies, Inc., Reno, Nev.

[21] Appl. No.: 985,894

[22] Filed: Dec. 4, 1992

[51] Int. Cl.⁵ .............................................. B60G 17/00
[52] U.S. Cl. ................................. 280/405.1; 414/469
[58] Field of Search ............... 414/469, 474, 476, 484, 414/485; 280/405.1; 180/24.02

[56] References Cited

U.S. PATENT DOCUMENTS

| | | | |
|---|---|---|---|
| Re. 30,581 | 4/1981 | Schneider | 280/81.1 |
| 3,860,256 | 1/1975 | Jackson et al. | 280/81.1 |
| 3,912,293 | 10/1975 | Harbers | 280/405.1 X |
| 4,063,779 | 12/1977 | Martin et al. | 298/22 P |
| 4,079,798 | 3/1978 | Ferris | 180/24.02 |
| 4,141,430 | 2/1979 | Eddy, Jr. | 180/24.02 X |
| 4,284,156 | 8/1981 | Carstensen et al. | 180/24.02 |
| 4,588,201 | 5/1986 | Mohrbacker | 280/405.1 |
| 4,595,210 | 6/1986 | Groeing | 414/474 X |
| 4,778,333 | 10/1988 | Youmans et al. | 414/563 |
| 4,797,058 | 1/1989 | Bilas | 414/563 |
| 4,854,409 | 8/1989 | Hillebrand et al. | 180/24.02 |
| 4,940,287 | 7/1990 | Ritchie | 298/23 R |
| 4,944,526 | 7/1990 | Eberling | 180/24.02 X |
| 4,993,729 | 2/1991 | Payne | 280/405.1 X |
| 5,025,677 | 6/1991 | Assh | 180/24.02 |
| 5,090,495 | 2/1992 | Christenson | 180/24.02 |
| 5,180,185 | 1/1993 | Eckert | 180/24.02 X |
| 5,195,764 | 3/1993 | Schantz et al. | 414/476 X |

Primary Examiner—David A. Bucci
Attorney, Agent, or Firm—Schneck & McHugh

[57] ABSTRACT

A compact tag axle assembly which may be retrofitted to an existing vehicle such as a tilting bed carrier to allow the vehicle to comply with axle load regulations when operated over public roadways. The assembly mounts behind the vehicle's rear axle such that the auxiliary wheels are in close proximity to the rear vehicle wheels, with the support framework of the auxiliary wheels entirely behind the mounting location of these wheels. The assembly consists of two interconnected independently suspended auxiliary wheels which are connected to the vehicle through a centrally located pair of common mounting brackets. The assembly has a minimal longitudinal displacement relative to the main vehicle rear wheels and is easily mounted beneath an existing vehicle.

24 Claims, 6 Drawing Sheets

TAG AXLE WITH REARWARDLY EXTENDING SUPPORT FRAMEWORK

TECHNICAL FIELD

The invention is directed generally to tag axles for redistributing the axle loads in load transporting vehicles which are subject to axle overloading and particularly to selectively deployable tag axles which can be attached to existing vehicles such as tilting bed vehicle carriers and the like.

BACKGROUND ART

Load support devices with retractable wheels known as auxiliary or tag axle assemblies are well known. Load transporting vehicles traveling on public roadways are frequently subject to a variety of state and/or federal regulations which limit the load per tire or per axle of the loaded vehicle. Tag axles allow a vehicle to comply with these regulations by increasing the number of vehicle axles. Auxiliary wheels are lowered from an elevated stowed position to a ground engaging support position. Design and placement of the tag axle assembly must accommodate the normal functioning of the vehicle.

Tag axle assemblies which extend from the rear of a vehicle and are pivoted between ground engaging and elevated positions are known. U.S. Pat. Nos. 4,940,287 to Ritchie and 4,063,779 to Martin et al. disclose extended reach tag axle assemblies which are mounted to the back end of a dump truck. The rearward extension of these devices in their ground engaging positions increases the overall length of the vehicle and decreases its maneuverability. In addition the wheels must be elevated above the dump bed before the vehicle can discharge its load.

Tag axle assemblies which mount beneath the frame of a vehicle are also known. U.S. Pat. No. 4,079,798 to Ferris discloses a pair of independent tag axle assemblies mounted beneath a concrete truck behind the rear wheels. In the ground engaging position the auxiliary wheels extend behind the back end of the concrete truck. U.S. Pat. No. 5,090,495 to Christenson discloses a pair of independent tag axle assemblies mounted entirely beneath the back end of a refuse truck behind the rear truck wheels. The auxiliary wheels pivot from their upper stowed position to the ground engaging position about a pivot point located between the auxiliary wheels and the rear wheels of the truck. Each auxiliary wheel is moved upwardly or downwardly by the levered action of opposed fluid operated springs. The tag axle is located as far as possible behind the rear driving axle to maximize the distance between the frontmost and rearmost axles of the vehicle.

The tag axle assemblies in the above cited prior art are designed for permanent attachment to a vehicle. Detachable tag axle assemblies are also known. Reissue Pat. No. 30,581 to Schneider discloses a removable supplementary support for the reduction of axle loads. The device consists of a pair of lever arms pivotally attached to each other at one end. The free ends of the lever arms are separated by adjustable biasing means. The lower lever arm has a centrally mounted axle with opposed wheels mounted to the axle on either side of the lever arm. The upper lever arm is adapted to be removably attached to a vehicle frame. The device is designed to be mounted at any appropriate location beneath the frame and removed from the vehicle when the auxiliary wheels are not needed. Consequently the separation between the biased ends of lever arms is restricted and the device does not move the wheels to an elevated stowed position. U.S. Pat. No. 3,860,256 to Jackson et al. discloses a compact tag axle assembly for attachment to a vehicle. The auxiliary wheels are raised and lowered by a dual directional hydraulic piston. The auxiliary wheels are located at one end of a leaf spring which pivots about the other end and the hydraulic cylinder is mounted at a location between the pivot and the auxiliary wheel which is closer to the pivot end than the wheel end. The device is mounted in front of the rear tag axle of a vehicle with the pivot end of the leaf spring at the leading edge of the device.

Vehicle towing apparatus, used to convert a standard pickup or flat bed truck to a tow truck, having secondary wheel and axle assemblies to stabilize the truck during towing are also known. U.S. Pat. No. 4,797,058 to Bilas discloses a supplemental axle assembly associated with a wheel lift vehicle towing device mounted in the truck bed of a pickup type truck. The supplemental wheels are mounted on the truck frame behind the rear axle via vertical air springs. The supplemental axle is secured to the truck's rear axle via a pair of pivotally attached trailing arms. U.S. Pat. No. 4,778,333 to Youmans et al. discloses a vehicle towing apparatus designed to be retrofitted to a standard pickup or flat bed truck having hydraulically positioned wheels which may be lowered during towing of an especially heavy load. The wheels are mounted on the towing device which is attached to the rear of the truck.

The prior art tag axle devices are typically designed to extend the auxiliary wheel behind the vehicle or as close to the rear of the vehicle as possible. Positioning of the deployed tag axle assembly in such a configuration can interfere with normal functioning of the vehicle. Tilting bed vehicle carriers are frequently also equipped with wheel lift towing devices and are particularly susceptible to extreme rear end loads while towing a second vehicle in addition to the vehicle carried on the tilting bed. The tilted bed must also contact the ground as close to the rear of the vehicle as possible while loading vehicles onto the tilted bed. Positioning of a tag axle assembly in front of the rear wheels of a vehicle does not provide additional transfer of load to the front axle by levering the back end upward.

Prior art tag axle assemblies with selectively deployable wheels are bulky and difficult to retrofit to an existing vehicle. Deployment of the wheels in such devices can also interfere with the normal functioning of the vehicle.

It is an object of the present invention to provide a compact tag axle assembly which can be mounted entirely beneath an existing vehicle. A further object of the invention is to provide a tag axle assembly which does not interfere with normal functioning of the vehicle when the wheels are deployed.

SUMMARY OF THE INVENTION

The above objects have been met by a compact tag axle assembly which hydraulically lowers and raises a pair of independently suspended auxiliary wheels which are located immediately behind the rear vehicle wheels. Each auxiliary wheel is suspended from the front end of a rectangular wheel support framework which is pivotally attached at its rearward end to a transverse connecting shaft. The front end of each wheel support framework is located adjacent to the rear vehicle wheels, in a closely spaced relation, and connected by a hydraulic cylinder to the transverse connecting shaft. Because the wheel support framework is essentially totally rearward of the mounting location of the auxiliary wheels, a compact assembly is achieved. The transverse connecting shaft is removably attached to the vehicle by a pair of centrally spaced mounting brackets. The transverse connecting shaft is located above the horizontal plane of the wheel support frameworks between the front and rear ends of the frameworks.

The front mounted wheel, rearward pivot and central location of the connecting shaft maximize the vertical travel of the auxiliary wheels for a given longitudinal displacement of the device beneath the vehicle. The compact longitudinal dimensions of the device allow it to be placed immediately behind the rear wheels of the vehicle, as close as a few inches from the perimeter of the rear wheels.

An advantage of the compact tag axle assembly of the present invention is that it can be easily mounted beneath many existing vehicles.

Another advantage is that deployment of the auxiliary wheels does not interfere with normal functioning of the vehicle.

DETAILED DESCRIPTION OF THE INVENTION

Figure 1:
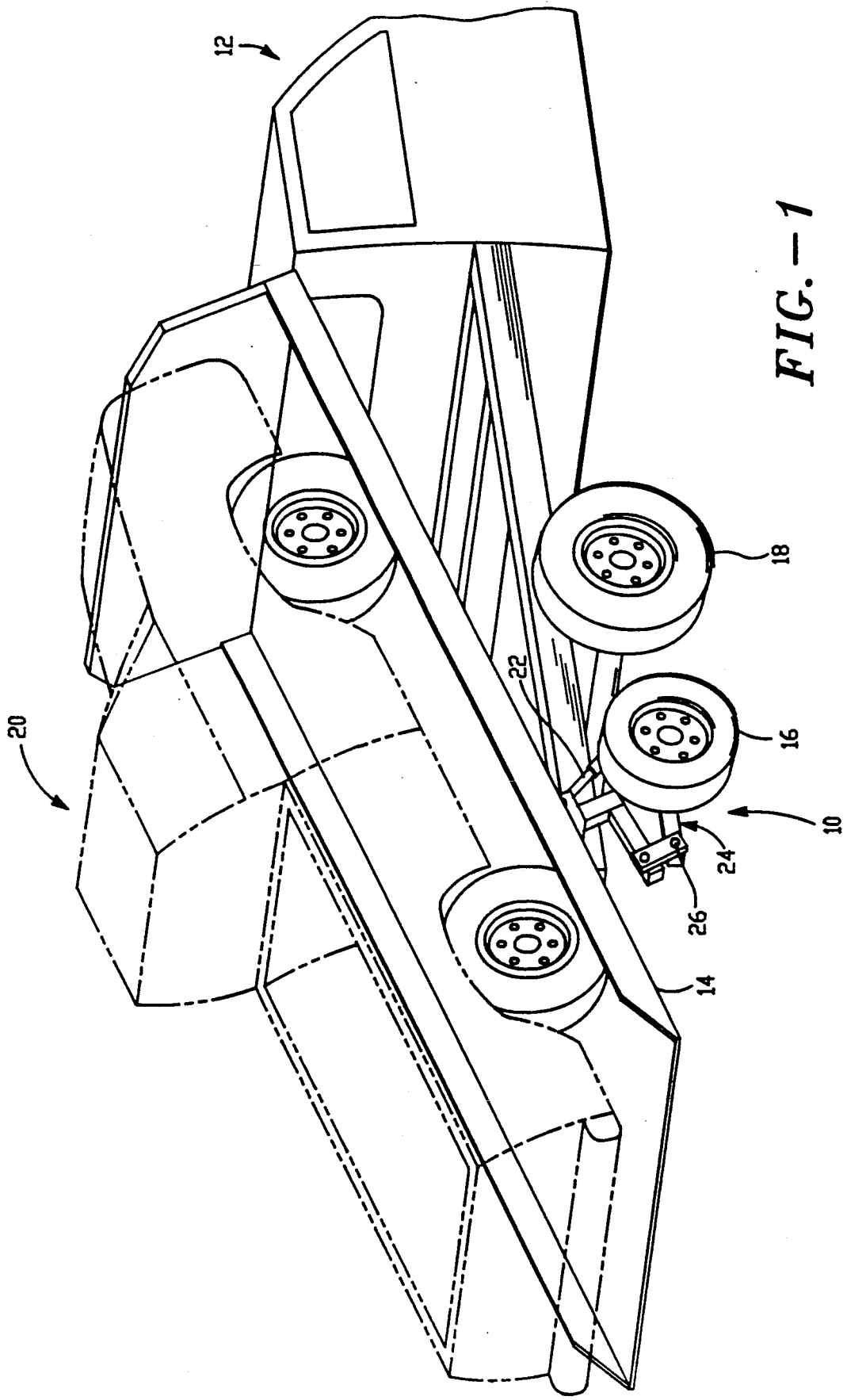
FIG. 1 is a perspective view of the present invention in operation.

With reference to FIG. 1, the tag axle assembly 10 is shown attached to the rear of a tilting bed vehicle carrier 12. Tag axle assembly 10 is attached to the undercarriage of a tilting bed 14 such that the downwardly deployable auxiliary wheels 16 are located behind and in close proximity to the rear vehicle wheels 18, preferably with a tread-to-tread separation distance of less than 10 inches in the ground engaging position. In contrast to the prior art, the support framework of the present invention is entirely rearward of the mounting location of the auxiliary wheels. Tag axle assembly 10 is shown in its ground engaging support position where it functions to shift the load 20 on tilting bed 14 forwardly, as well as stabilizing the rear of the bed.

Auxiliary wheels 16 are raised and lowered by a pair of conventional dual directional hydraulic cylinders 22. Cylinders 22 are attached to a pair of rectangular wheel support frameworks 24, which rotate about a plurality of pivot points 26 located rearwardly of auxiliary wheels 16.

Referring now to FIGS. 2A-2D, auxiliary wheels 16 are mounted on a pair of stub axles 28 which are offset rearwardly and downwardly from wheel support framework 24 by an axle offset 30. Axle offset 30 is connected to the exterior end of a rubber torsion axle 32 which forms the front end member of wheel support framework 24. In the preferred embodiment axle offset 30 forms a downward angle of 22° relative to the plane of wheel support framework 24. The forward edge of auxiliary wheel 16 is parallel to torsion axle 32, minimizing the longitudinal displacement of tag axle assembly 10 from the main rear wheels of a vehicle.

Each wheel support framework 24 is pivotally connected to a transverse connecting shaft 34 by a pair of rigid, L-shaped members 36. Connecting shaft 34 has a pair of vertical towers 38 at opposite ends.

Figure 2A:
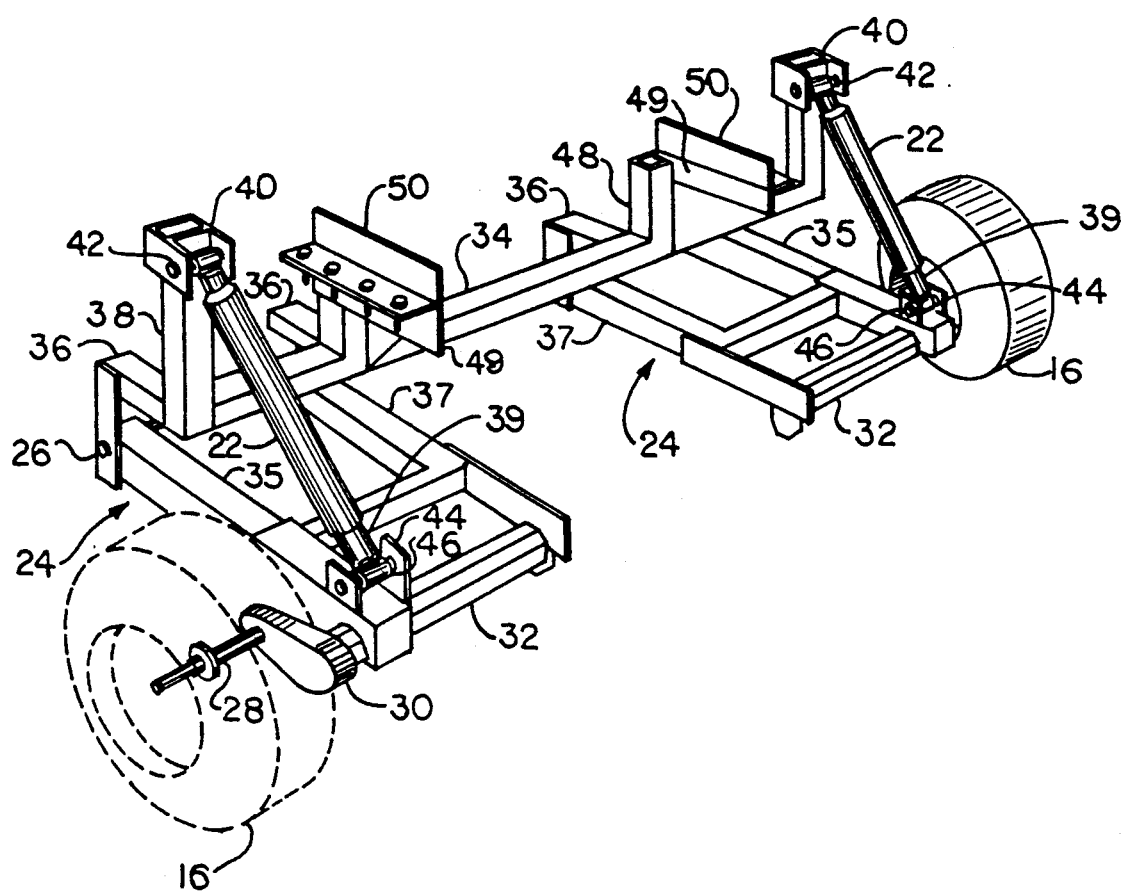
FIG. 2A is a right front perspective of the tag axle assembly.
Figure 2B:
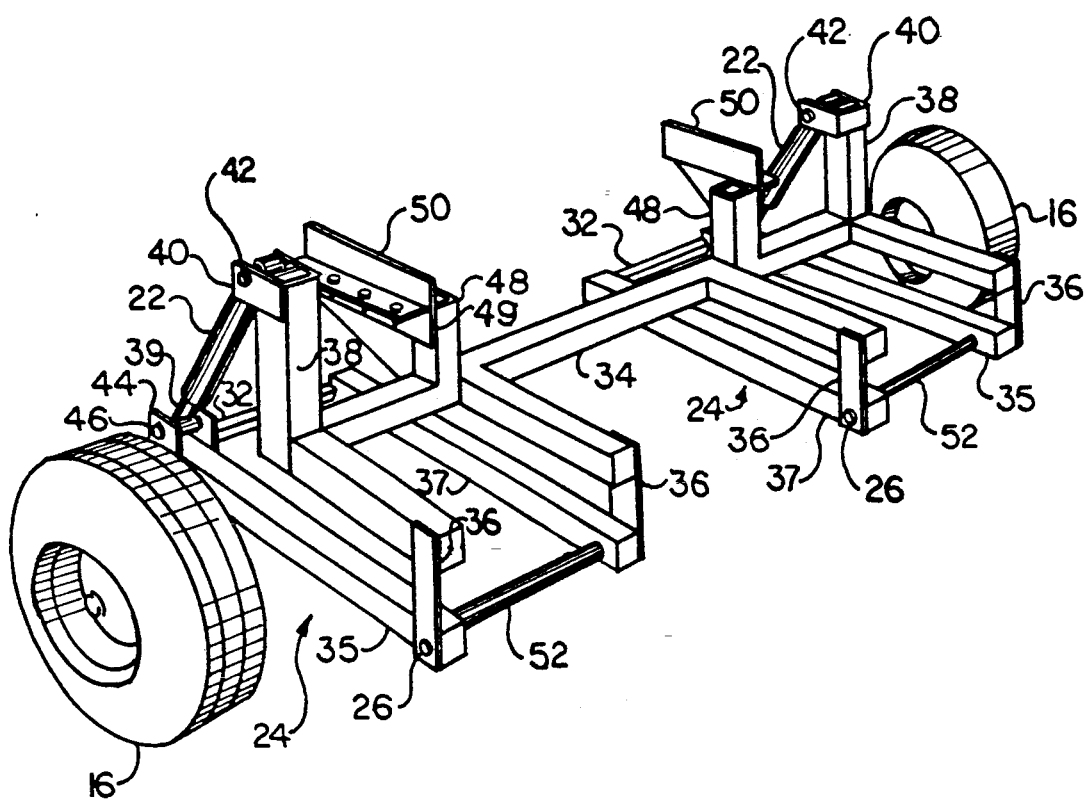
FIG. 2B is a left rear perspective of the tag axle assembly.
Figure 2C:
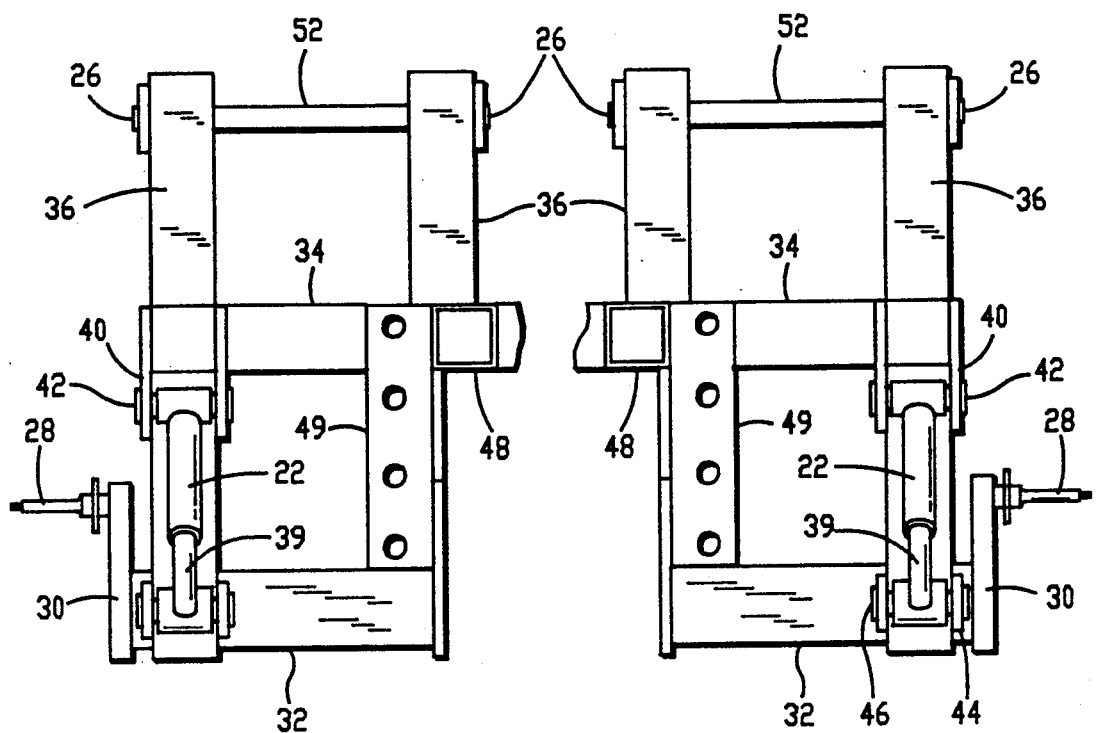
FIG. 2C is a top view of the tag axle assembly.
Figure 2D:
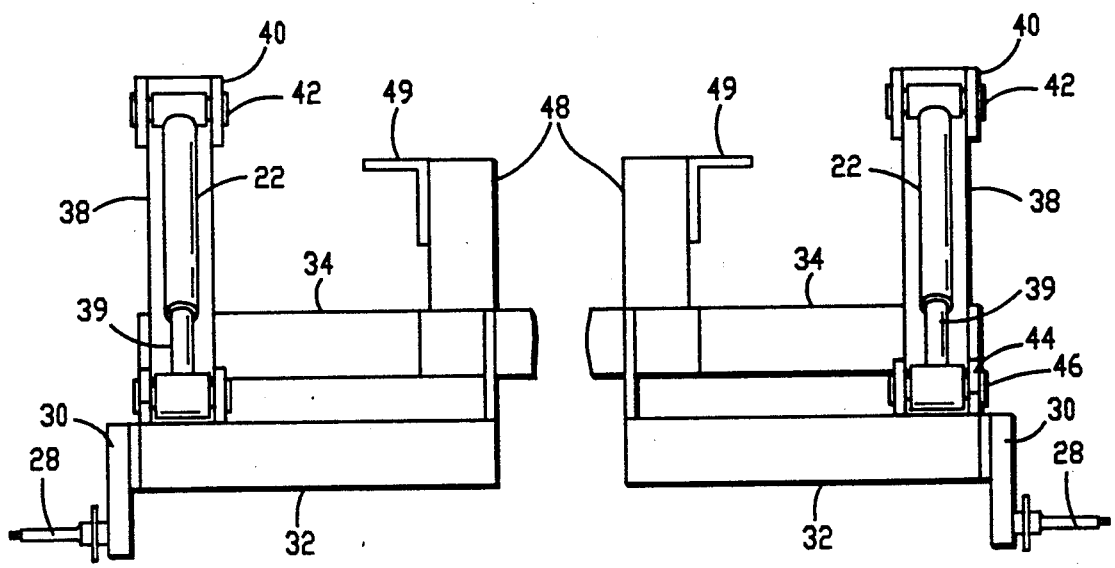
FIG. 2D is a front view of the tag axle assembly.

Compactness of the assembly is primarily achieved because the exterior longitudinal support beam 35 and interior longitudinal support beam 37 of support framework 24, seen in FIGS. 2A and 2B, extend rearwardly from the auxiliary wheels. Most of the support framework 24 is distal to the rear axle of an associated vehicle in a rearward direction, allowing the auxiliary wheels to be close to the main vehicle wheels and allowing the present invention to be retrofitted to many existing vehicles. Note that the auxiliary wheels are mounted from the most forward portion of the framework 24.

Each hydraulic cylinder 22 has an extendible piston 39. The upper end of hydraulic cylinder 22 is pivotally attached to a forwardly facing U-shaped bracket 40 located at the upper end of vertical tower 38 by a pivot pin 42. The lower end of extendible piston 39 is pivotally attached to an upwardly facing U-shaped bracket 44 located at the front exterior corner of wheel support framework 24 by a pivot pin 46.

Transverse connecting shaft 34 has a pair of centrally spaced vertical mounting members 48 with a longitudinally extending L-shaped mounting bracket 49 which is bolted to a corresponding L-shaped mounting bracket 50 welded to vehicle 12. Mounting members 48 are positioned to facilitate mounting of tag axle assembly 10 to a convenient location on vehicle 12. In the preferred embodiment mounting members 48 are positioned to mount tag axle assembly 10 to the support framework of tilting bed 14. The present invention could also be mounted to the frame of a vehicle which does not have a tilting bed. The auxiliary axle is split to avoid any interference with centrally mounted mechanical devices frequently found in existing vehicles, for example wheel lift towing devices or spare tires.

Rectangular wheel support frameworks 24 are pivotally connected to L-shaped members 36 at pivot points 26 by a pair of pivot shafts 52 which form the rearward end members of rectangular wheel support frameworks 24. Transverse connecting shaft 34 is located above rectangular wheel support frameworks 24 between torsion axle 32 and pivot shaft 52.

Figure 3A:
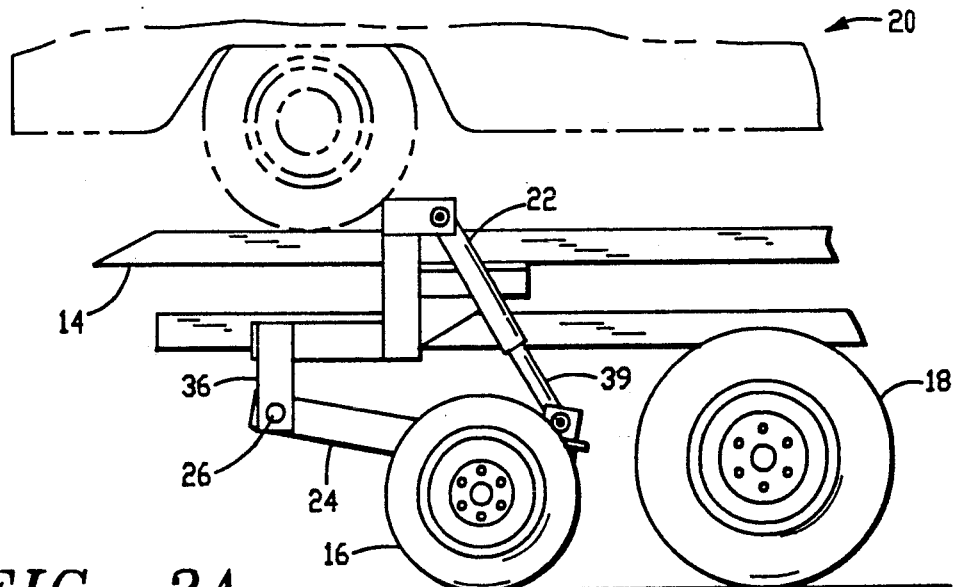
FIG. 3A is a side view of the invention in its ground engaging position during the transport of a load.

Referring to FIG. 3A, auxiliary wheel 16 is shown at a lower ground engaging position behind rear vehicle wheel 18. Extension of piston 39 from hydraulic cylinder 22 exerts a lifting force on tilting bed 14, supporting a portion of load 20 and shifting an additional portion of load 20 forwardly. Axle offset 30, not shown, is generally parallel to the ground in this position allowing for stable tracking of auxiliary wheels 16.

Figure 3B:
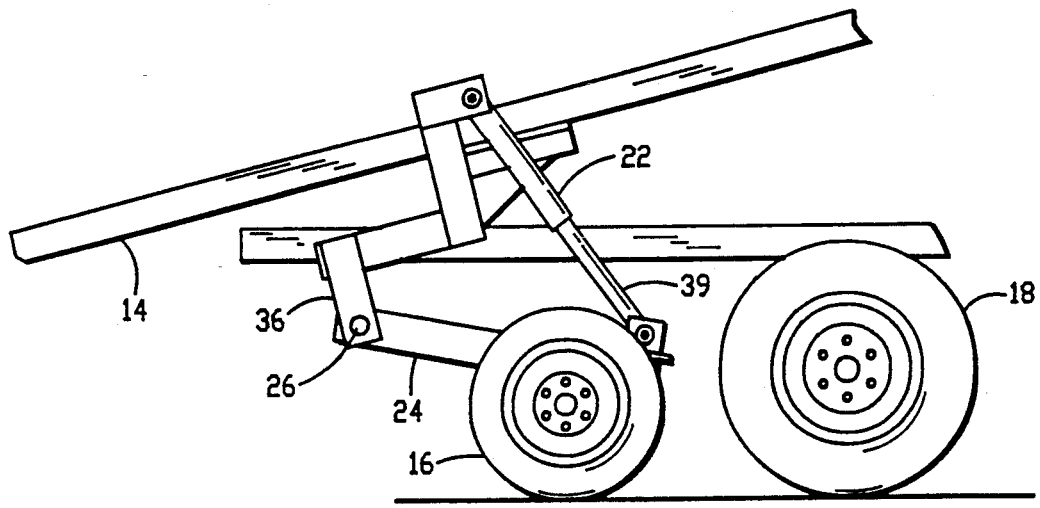
FIG. 3B is a side view of the invention in its ground engaging position during the loading or unloading of a vehicle.

Referring to FIG. 3B, piston 39 can be further extended from hydraulic cylinder 22 during loading and unloading of tilting bed 14. Deployment of auxiliary wheel 16 in its ground engaging position during loading and unloading helps to stabilize vehicle 12 and prevent rearward tipping of the vehicle.

Figure 3C:
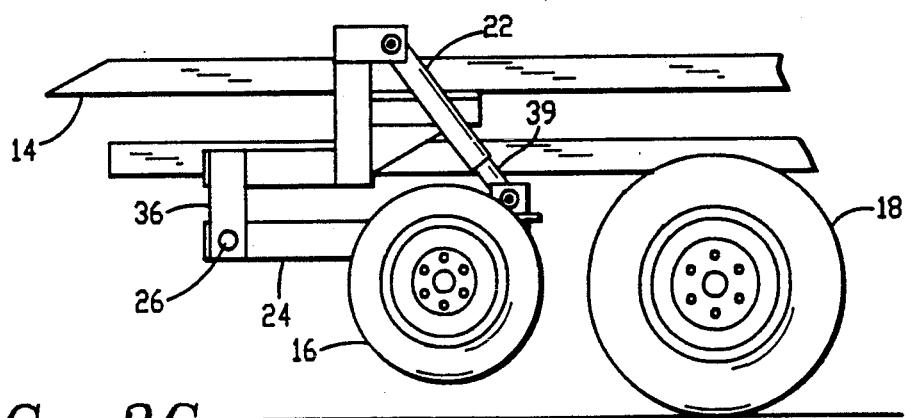
FIG. 3C is a side view of the invention in its upward stowed position.

Referring to FIG. 3C, auxiliary wheel 16 is shown in its upward stowed position. Auxiliary wheel 16 is stowed in a non-ground engaging position when vehicle 12 is operated in an unloaded condition to prevent undue tire wear. Piston 39 is fully retracted into cylinder 22. Wheel support framework 24 is generally parallel to the ground in this position and in the preferred embodiment auxiliary wheel 16 has a tread-to-tread separation from vehicle wheel 18 of 3-4 inches in the stowed position.

Referring generally to FIGS. 3A-3C it can be seen that auxiliary wheel 16 moves downwardly and rearwardly relative to vehicle 12 when wheel support framework 24 rotates about pivot point 26. Auxiliary wheel 16 is closest to vehicle wheel 18 in the upper stowed position and the tread-to-tread separation between the wheels increases as auxiliary wheel 16 is deployed.

Figure 4:
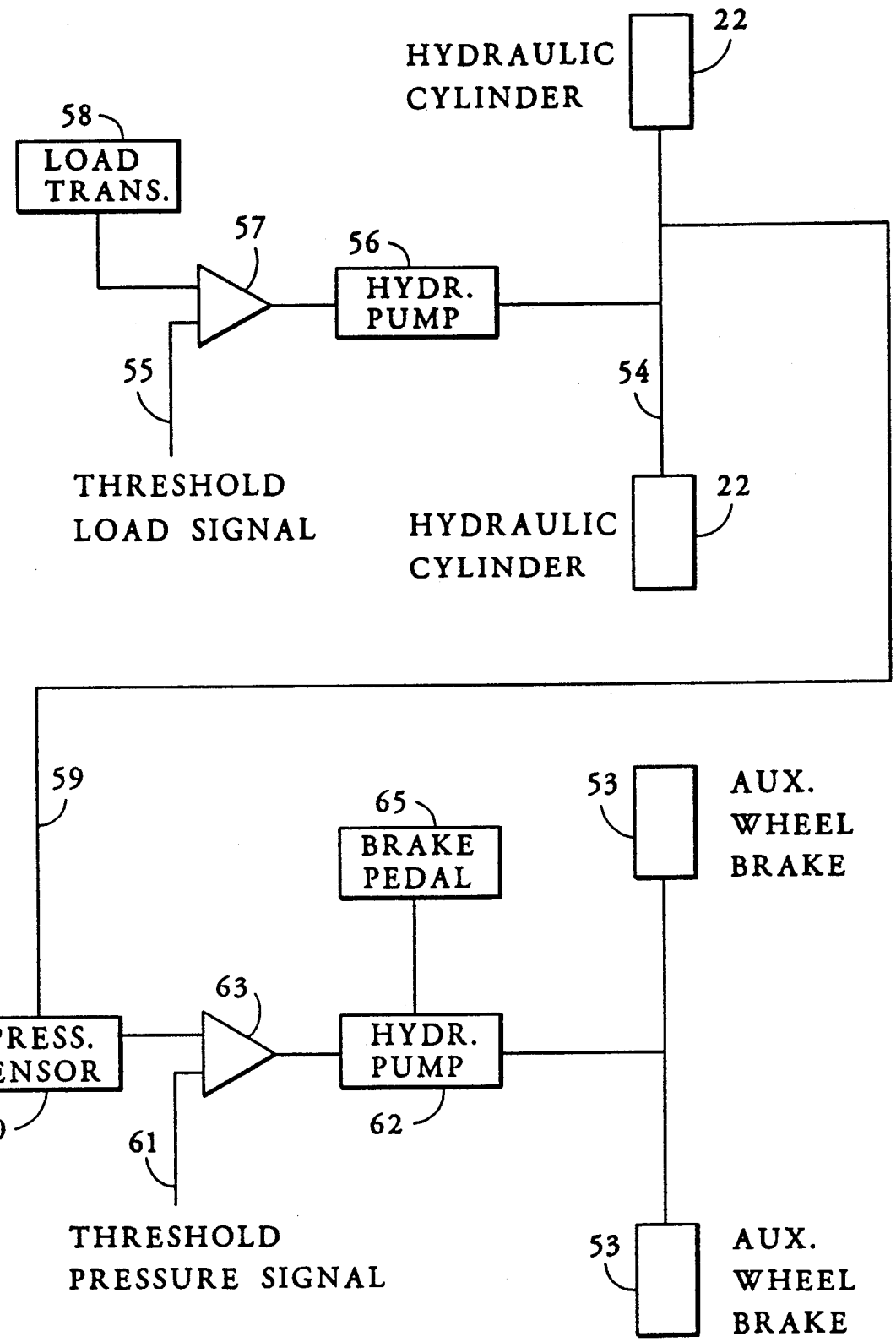
FIG. 4 is a schematic view of the hydraulic system.

Referring to FIG. 4, a schematic diagram of the hydraulic system controlling deployment of the tag axle assembly 10 and the auxiliary wheel brakes 53 is shown. Hydraulic cylinders 22 are connected to a common hydraulic supply line 54. An increase in the hydraulic pressure of one hydraulic cylinder due to the sudden upward movement of one of the auxiliary wheels increases the hydraulic pressure to the opposing cylinder further extending the piston of that cylinder to prevent the tilting bed from tipping sideways, for example, when the vehicle mounts a curb.

Hydraulic fluid is supplied to hydraulic line 54 from a first hydraulic pump 56. Pump 56 may be manually operated or automatically operated when the load on the rear vehicle axle sensed by a load transducer 58 exceeds a preset threshold load signal 55, automatically deploying the tag axle assembly. The preset threshold signal 55 is compared with a load signal from electrical load transducer 58 in a voltage comparator 57. When the load signal exceeds the threshold signal, the comparator 57 outputs a command signal to pump 56 and the pump 56 is actuated, operating the hydraulic cylinders 22, which deploy the auxiliary wheels. This causes the load of the vehicle to be shifted forwardly, placing more weight on the front axle and less on the rear axle. For example, the threshold may be set to the maximum rear axle load allowable in a jurisdiction which a truck will enter. Then, the auxiliary wheels will automatically deploy, shifting weight to the front axle, if the rear axle load limit in that jurisdiction is exceeded, thereby keeping the vehicle in compliance with axle load limits.

A pressure sensor 60 is attached to a hydraulic fluid supply line 59. When the pressure in hydraulic line 59 exceeds a preset pressure threshold signal on a wire line 61, indicating that tag axle assembly 10 is in a loaded, ground engaging support position, a command signal is generated by a voltage comparator 63. The command signal is sent to a second hydraulic pump 62, enabling operation of the auxiliary wheel brakes 53 which are operated by way of the vehicle's normal braking system, indicated by brake pedal 65. Without the command signal the brakes of the auxiliary wheels are not operable In this manner, the brakes of the auxiliary wheels will be operable only when they are in solid contact with the road.

What is claimed is:

1. A load shifting tag axle for a vehicle having a load bed supported by a vehicle frame with a front and rear axle, each vehicle axle having opposed main wheels of a specified radial dimension comprising:
   an auxiliary frame connected to the vehicle frame at a mounting location rearward of the rear vehicle axle;
   transversely extending torsion means for independently suspending a pair of vertically movable auxiliary wheels from said auxiliary frame; and
   actuator means for raising and lowering said auxiliary wheels, wherein lowering said auxiliary wheels in a ground engaging position tilts the vehicle load bed forwardly such that a load carried on said bed is shifted toward the front vehicle axle.

2. The apparatus of claim 1 wherein said auxiliary wheels have a smaller radial dimension than said main wheels.

3. The apparatus of claim 1 wherein the periphery of each auxiliary wheel has a separation distance relative to the closest radial extent of the main wheels of less than 12 inches when the auxiliary wheels have been lowered.

4. The apparatus of claim 1 wherein said actuator means comprises a hydraulic line with a T-shape, with a hydraulic cylinder at opposed T edges, each cylinder having opposed ends, with one end connected to said auxiliary frame and an opposite end connected to a rigid auxiliary wheel support member pivotally connecting said torsion means to said auxiliary frame.

5. The apparatus of claim 1 wherein said auxiliary frame has a pair of pivot shafts parallel to said rear vehicle axle, each of said pivot shafts having at least one rigid pivotally attached wheel support member with a front end connected to said torsion means.

6. The apparatus of claim 5 wherein said pivot shafts are rearward of said auxiliary wheels.

7. The apparatus of claim 5 wherein said torsion means includes at least one torsion axle having at least one axle offset member extending rearwardly and downwardly from an exterior end of said torsion axle to an auxiliary wheel mount.

8. The apparatus of claim 1 wherein said auxiliary frame is connected to said vehicle frame by a pair of opposed, spaced apart brackets.

9. The apparatus of claim 1 wherein said load bed is a tilting bed with a rearward pivot point.

10. The apparatus of claim 1 wherein said actuator means includes a load sensor means for determining loads on said rear axle in excess of a threshold and generating an actuator signal, said actuator means responsive to said actuator signal.

11. The apparatus of claim 4 wherein said actuator means includes a pressure sensor attached to said hydraulic line for determining loads on said auxiliary wheels in excess of a threshold and generating an enabling signal to auxiliary wheel brakes attached to said auxiliary wheels.

12. A load shifting apparatus for a vehicle having a tilting load bed supported by a vehicle frame comprising:
   a set of support wheels on a rear axle of said vehicle frame, said support wheels being in contact with the ground;
   a framework having auxiliary wheels, said framework being mounted beneath said load bed at an attachment location rearward of said rear vehicle support wheels, said auxiliary wheels being suspended from at least one transversely extending torsion axle, said auxiliary wheels having an upper stowed position proximate to said load bed wherein said wheels are not in contact with the ground and a lower ground engaging position; and means for selectively deploying said auxiliary wheels upwardly and downwardly between said upper and lower positions, wherein downward deployment of said auxiliary wheels to said lower ground engaging position exerts a lifting force at said attachment location shifting the load on said rear axle forwardly.

13. The apparatus of claim 12 wherein said framework has pivotally attached rigid wheel support members, said support members being longitudinally disposed with a forward end connected to said torsion axle, said forward end being spaced apart from said pivotal attachment.

14. The apparatus of claim 13 wherein each of said auxiliary wheels is suspended from a separate torsion axle.

15. The apparatus of claim 14 wherein said auxiliary wheel is mounted rearward of said torsion axle on an axle offset member.

16. The apparatus of claim 13 wherein said deployment means comprises a hydraulic line with a T-shape, with a hydraulic cylinder at opposed T edges, each cylinder having opposed ends, with one end connected to the framework adjacent to said attachment location and an opposite end connected to one of said wheel support members.

17. The apparatus of claim 16 further including a pressure sensor connected to said hydraulic line for determining pressure in excess of a threshold indicating deployment of said auxiliary wheels and generating an enabling signal to auxiliary wheel brakes attached to said auxiliary wheels.

18. The apparatus of claim 12 wherein said framework is removably attached to said bed.

19. The apparatus of claim 12 further including a load sensor means for determining loads on said rear axle in excess of a threshold and activating said deployment means in response to said loads.

20. A load shifting apparatus for use with a vehicle having a load bed supported by a vehicle frame comprising:

a set of opposed main wheels on a rear axle of said vehicle frame;

first and second horizontal rectangular wheel support frames, each having spaced apart front and rear end members separating exterior and interior side members, each of said support frames having an axle offset extending rearwardly and downwardly from a front exterior corner of said frame to a stub axle and an auxiliary rotor wheel;

a transverse horizontal connecting shaft parallel to and between the front and rear end members of each of said frames having a first end located above the exterior side member of said first frame and a second end located above the exterior side member of said second frame;

first and second pairs of parallel L-shaped connectors coupling said connecting shaft to said wheel support frames, each of said L-shaped connectors having first and second ends, with said first end pivotally attached to a rear corner of one of said frames and with said second end rigidly attached to said connecting shaft, said connecting shaft having a vertical tower at each end with each of said vertical towers having biasing means interposed between an upper end of said vertical tower and a front end of the closest exterior side member of said wheel support frames; and first and second parallel vertical mounting members rigidly coupled to said connecting shaft and adapted to be removably attached to said load bed such that the front end members of said wheel support frames are located forward of said mounting members and rearward of said rear main wheels, wherein activation of said biasing means pivots the front ends of said wheel support frames downwardly and rearwardly about said rear end members displacing said auxiliary wheel to a ground engaging position, said auxiliary wheels thereby exerting a lifting force on said load bed shifting the load on said rear axle forwardly.

21. The apparatus of claim 20 wherein each of said biasing means includes a hydraulic cylinder.

22. The apparatus of claim 21 wherein said hydraulic cylinders are connected to a common hydraulic supply line.

23. The apparatus of claim 22 further including a pressure sensor attached to said hydraulic line for determining pressures in excess of a threshold indicating a lifting force on said load bed by said auxiliary wheels and enabling an auxiliary wheel brake attached to said auxiliary wheels.

24. The apparatus of claim 20 further including a load sensor means for determining loads on said rear axle in excess of a threshold and activating said biasing means in response to said loads.

* * * * *